United States Patent [19]
Jackson

[11] 3,856,771
[45] Dec. 24, 1974

[54] PROCESS FOR MANUFACTURING ALKALI METAL OR AMMONIUM INSULIN

[75] Inventor: Richard L. Jackson, Indianapolis, Ind.

[73] Assignee: Eli Lilly and Company, Indianapolis, Ind.

[22] Filed: July 16, 1973

[21] Appl. No.: 379,695

[52] U.S. Cl............................. 260/112.7, 424/178
[51] Int. Cl... C07c 103/52, C07g 7/00, A61k 17/02
[58] Field of Search.................. 260/112.7; 424/178

[56] References Cited
UNITED STATES PATENTS 2,849,370  8/1958  Peterson, et al................... 424/178
3,719,655  3/1973  Jackson .......................... 260/112.7
3,752,798  8/1973  Amird, et al..................... 260/112.7

*Primary Examiner*—Lewis Gottis
*Assistant Examiner*—Reginald J. Suyat
*Attorney, Agent, or Firm*—William E. Maycock; Everet F. Smith

[57]  ABSTRACT

Alkali metal or ammonium insulin is obtained by preparing an alkaline solution of a divalent metal insulin, chelating agent, and alkali metal or ammonium ions and crystallizing the desired insulin.

8 Claims, 4 Drawing Figures

PATENTED DEC 24 1974                3,856,771

PROCESS FOR MANUFACTURING ALKALI METAL OR AMMONIUM INSULIN

BACKGROUND OF THE INVENTION

This invention relates to alkali metal and ammonium insulins. More particularly, this invention relates to a process for preparing an alkali metal or ammonium insulin from a divalent metal insulin.

Presently-available commercial insulin preparations for the treatment of diabetes mellitus usually are classed as having short, intermediate, or prolonged durations of hypoglycemic activity. In many cases of diabetes, particularly with pediatric patients, an insulin preparation having both a rapid onset and a prolonged duration of hypoglycemic activity, i.e., a dual-activity insulin preparation, is desirable.

In recent years, a dual-activity insulin preparation was provided by mixing at least two different insulin preparations. Typically, such a mixture would consist of a solution of zinc insulin derived from pork pancreas and a suspension of beef high-zinc insulin. Other preparations consisted of mixtures of a zinc insulin solution with either a protamine insulin or a protamine zinc insulin suspension.

However, all of these prior art dual-activity insulin preparations presented problems, even through dual-activity to some extent was achieved. Usually, the problems encountered involved storage, preservation, purity, stability, color, and contamination with a hyperglycemic factor (glucagon) and high molecular weight antigenic proteins.

Many, if not all, of these problems heretofore associated with commercial dual-activity insulin preparations are avoided by the use of preparations comprising an alkali metal or ammonium insulin and protamine, which preparations are described and claimed in U.S. Pat. application, Ser. No. 139,120, filed Apr. 30, 1971, now U.S. Pat. No. 3,758,683.

The alkali metal and ammonium insulins generally are prepared by the process of U.S. Pat. No. 3,719,655, which process involves adjusting an insulin-containing solution to a pH of about 7.2–10.0 and the alkali metal or ammonium ion concentration to about 0.2–1.0 M, thereby causing crystallization of the alkali metal or ammonium insulin. Although the problems associated with zinc crystallization are avoided, the non-insulin protein constituents normally removed only by zinc crystallization remain with the alkali metal or ammonium insulin. Thus, a dual-activity insulin preparation must use either an alkali metal or ammonium insulin which often contains non-insulin protein constituents not present in zinc insulin, or a prior art mixtue with all of the problems related thereto.

SUMMARY OF THE INVENTION

It therefore is an object of the present invention to provide a process for the preparation of high-purity alkali metal or ammonium insulin.

This and other objects will be apparent to those skilled in the art from a consideration of the specification and claims which follow.

According to the present invention, high-purity alkali metal or ammonium insulin is obtained by the process which comprises preparing an alkaline aqueous solution of a divalent metal insulin, which solution contains a divalent metal ion chelating agent and alkali metal or ammonium ions, and crystallizing the desired alkali metal or ammonium insulin therefrom.

BRIEF DESCRIPTION OF THE DRAWINGS

The drawings are representations of the polyacrylamide disc-gel electrophoresis analyses of the sodium insulin starting materials and the sodium insulin products of Examples 2 and 3.

DETAILED DESCRIPTION OF THE INVENTION

Figure 1:
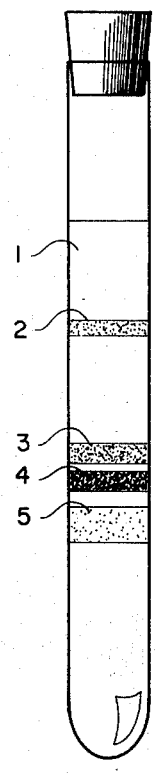

The term "alkali metal" as used herein includes the elements of group 1A, up to and including period 5, of the periodic table of the elements (Robert C. Weast, Editor, "Handbook of Chemistry and Physics," 53rd Edition, The Chemical Rubber Co., Cleveland, Ohio, 1968, p. B-3). Lithium, sodium, and potassium are preferred, with sodium being most preferred.

The term "divalent metal" as used herein includes the elements of groups VIIB, VIII, IB, and IIB of the periodic table of the elements. The preferred divalent metals are manganese, iron, cobalt, nickel, copper, zinc, and cadmium. Because of its commercial importance, the most preferred divalent metal is zinc.

As indicated hereinabove, the process of the present invention requires an alkaline aqueous solution of a divalent metal insulin, which solution also contains chelating agent and alkali metal or ammonium ion. The pH of the solution normally can vary from about 7.6 to about 8.6, with the preferred pH being about 8.2.

The concentration of divalent metal insulin can vary from about 10 to about 1,000 International Units per milliliter of solution (U/ml). The preferred concentration of divalent metal insulin is about 500 U/ml.

The chelating agent which is employed in the process of the present invention can be represented by the following general formula:

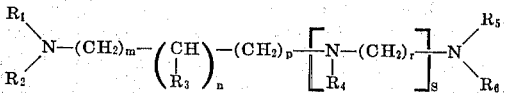

wherein $R_1$ and $R_5$ are monovalent organic radicals independently selected from the group consisting of carboxymethyl, carboxyethyl, $C_1$–$C_6$ alkyl, and $C_1$–$C_6$ hydroxyalkyl; $R_2$ and $R_6$ are monovalent organic radicals independently selected from the group consisting of carboxymethyl and carboxyethyl; $R_3$ is a monovalent radical selected from the group consisting of hydrogen, hydroxy, and $C_1$–$c_6$ alkyl; $R_4$ is a monovalent radical selected from the group consisting of hydrogen, carboxymethyl, and carboxyethyl; $m$ is an integer from 1 to 6, inclusive; $n$ is an integer which is either 0 or 1; $p$ is an integer which is either 0 or 1; $r$ is an integer from 2 to 6, inclusive; and $s$ is an integer from 0 to 2, inclusive.

Examples of chelating agents included within the above general formula include, among others, ethylenediamine-N,N,N',N'-teraacetic acid, 1,2-diaminopropane-N,N,N',N'-tetraacetic acid, 1,3-diamino-2-hydroxypropane-N,N,N',N'-tetraacetic acid, diethylenetriaminetetraacetic acid, diethylenetriaminepentaacetic acid, hexamethylenediamine-N,N,N',N'-tetraacetic acid, N-butylethylenediamine-N,N',N'-triacetic acid, N,N'-dimethyltetramethylenediamine-N,N'-diacetic acid, N-(2-hydroxyethyl) ethylenediamine-N,N', N'-triacetic acid, ethylenediamine-N,N,N', N'-tetrapropionic acid, and the like. The preferred chelating agents are polymethylenediaminetetraacetic acids; the most preferred chelating agent is ethylenediamine-N,N,N',N'-tetraacetic acid.

In general, the chelating agent can be employed as either the free acid or an alkali metal or ammonium salt thereof. If a salt is used, the cation of the salt must be the same as the cation of the desired alkali metal or ammonium insulin. Furthermore, the amount of cation added as a result of using such a salt must be taken into consideration when determining the amount of alkali metal or ammonium ions desired.

To remove the divalent metal from the insulin and to permit rapid crystallization of the alkali metal or ammonium insulin, the molar ratio of chelating agent to divalent metal in the divalent metal insulin should be at least about 3:1. At lower ratios, the rate of crystallization of alkali metal or ammonia insulin from alkaline solution is reduced. Furthermore, at lower ratios there is increased likelihood that at least some divalent metal will remain bound to the insulin.

Consequently, the concentration of chelating agent should be at least about 0.0002 M and can be as high as about 0.05 M. At a divalent metal insulin concentration of about 500 U/ml, the preferred concentration of chelating agent is about 0.01 M.

The alkaline aqueous solution of divalent metal insulin employed in the process of the present invention also must contain alkali metal or ammonium ions. In general, the concentration of alkali metal or ammonium ions can vary from about 0.2 M to about 1.0 M.

The alkali metal or ammonium ions can be provided by any water-soluble compound which does not have a deleterious effect on insulin under the process conditions employed. Furthermore, the alkali metal or ammonium ions can be provided by more than one such water-soluble compound. Of course, the cation of the alkali metal or ammonium insulin desired determines which of these ions shall be provided.

As stated hereinbefore, a portion of the required alkali metal or ammonium ions can be supplied by utilizing the chelating agent in the form of an alkali metal or ammonium salt. The required ions also can be provided by the basic alkali metal or ammonium compound which normally is required to adjust the solution pH to the requisite degree of alkalinity. Finally, the required ions can be provided by an alkali metal or ammonium salt, the anion of which can be, among others, chloride, bromide, fluoride, iodide, acetate, sulfate, phosphate, and the like. The chloride and phosphate salts are preferred, with chlorides being most preferred. As indicated hereinabove, the particular alkali metal or ammonium ions employed shall be the same as the cation of the desired alkali metal or ammonium insulin. Usually, the required ions are provided by a combination of all three of the foregoing materials.

In general, the alkaline aqueous solution of divalent metal insulin employed in the process of the present invention can be prepared by any of the methods known to those skilled in the art. Since all of the constituents of said alkaline aqueous solution are soluble under the conditions crtical. employed, the manner of preparation of said alkaline aqueous solution is not critical.

One known method, which is preferred, for the preparation of the alkaline aqueous solution of divalent metal insulin comprises dissolving divalent metal insulin in an acidic aqueous medium and adjusting the resulting solution to an alkaline pH with a suitable base. In general, chelating agent and additional alkali metal or ammonium ions can be added at any time, either as solids or in aqueous solutions. If solutions are used, the increase in total solution volume must be taken into consideration in order to obtain the desired final concentrations of constituents.

The acidic aqueous solution of divalent metal insulin should have a pH of from about 2.5 to about 3.5. The acidity of the solution can be provided by any mineral acid, although hydrochloric acid is preferred. The preferred pH of the solution is about 3, and is most suitably obtained by dissolving the divalent metal insulin in dilute hydrochloric acid.

If desired, the acidic aqueous solution of divalent metal insulin can contain preservatives and/or other agents, such as isotonic agents. Examples of suitable preservatives include phenol, methylparaben, and the like. Examples of suitable isotonic agents include glycerin, glucose, and the like.

The amount of preservative, when employed, can be as high as 0.4%, weight per volume, although the preferred concentration is about 0.2%. The use of a preservative is desirable, with phenol being the preferred preservative. It has been observed that phenol also enhances the crystallization rate of the desired alkali metal or ammonium insulin.

The acidic aqueous solution of divalent metal insulin then is made alkaline with a suitable base. In general, the base employed will be an alkali metal or ammonium hydroxide, carbonate, of other like basic compound. A concentrated aqueous solution of the appropriate hydroxide is preferred in order to avoid extensive dilution of the divalent metal insulin solution and to avoid the heat henerated by some compounds, such as the solid alkali metal hydroxides.

As stated herinbefore, chelating agent and alkali metal or ammonium ions can be added to the divalent metal insulin solution at any time. For example, the divalent metal insulin can be dissolved in dilute aqueous hydrochloric acid which contains chelating agent. Alternatively, chelating agent can be added to the acidic aqueous solution of divalent metal insulin. Or, chelating agent can be added to the divalent metal insulin solution after the solution has been made alkaline.

Usually, the chelating agent is added to acidic solutions in the form of an alkali metal or ammonium salt; complete neutralization of all carboxy groups in the chelating agent is desired for enhanced water solubility. On the other hand, the chelating agent normally is added to alkaline solutions as the free acid.

In the preferred method for preparing the alkaline aqueous solution of divalent metal insulin, alkali metal or ammonium ions are added in conjunction with the addition of chelating agent. Additional ions are supplied with the base employed to render the acidic solution alkaline. The remaining ions required are provided by adding an appropriate amount of alkali metal or ammonium salt. This salt usually is added prior to making the solution alkaline, but such addition can take place any time as described for the addition of chelating agent.

Another known method for the preparation of an alkaline aqueous solution of a divalent metal insulin comprises dissolving the divalent metal insulin in an aqueous alkaline medium having a pH of from about 8 to about 9.5 and adjusting the resulting solution to a pH of from about 7.6 to about 8.6. The alkalinity of the initial aqueous solution normally will be provided by alkali metal or ammonium base, described hereinbefore. The reduction in alkalinity then can be accomplished by the addition of dilute mineral acid, hydrochloric acid and phosphoric acid being preferred. It perhaps should be noted that solutions more concentrated in divalent metal insulin might be more difficult to prepare than dilute solutions because of the reduced solubilities of divalent metal insulins in alkaline solutions.

The addition of chelating agent, and alkali metal or ammonium ions, if required, can be accomplished at any time. Usually, both chelating agent and alkali metal or ammonium ions will be added prior to the final adjustment of pH.

Once the alkaline aqueous solution of divalent metal insulin has been prepared, the alkali metal or ammonia insulin crystallizes from solution, usually at ambient temperature, although higher or lower temperatures can be utilized if desired. In general, however, the crystallization temperature should be less than about 30°C.

The crystals of alkali metal or ammonium insulin thus obtained then are isolated by any of the procedures known to those skilled in the art. Typically, the crystals are isolated by centrifugation and washed successively with dilute alkali metal or ammonium salt solution (usually about 0.5 M), acetone, absolute alcohol, and ether; the crystals then are dried in vacuo.

The present invention will be more fully described, without intending to limit it in any manner, by the following examples which illustrate certain preferred embodiments. All temperatures are in degrees centigrade.

EXAMPLE 1

Eight g. of zinc insulin composed of about 70% beef and 30% pork insulins was dissolved in 400 ml of acid-phenol water which was prepared by dissolving 0.8 g. of phenol in 400 ml of 0.01 N aqueous hydrochloric acid. The resulting solution was divided into four equal portions, to each of which was added 2.0 g. of sodium chloride. The four portions were labeled Samples 1–4, inclusive. Ethylenediaminetetraacetic acid, tetrasodium salt, was added to three of the samples as tabulated below:

| Sample | EDTA Amount, grams | Molar Conc. |
|---|---|---|
| 1 | 0 | 0 |
| 2 | 0.416 | 0.010 |
| 3 | 1.04 | 0.025 |
| 4 | 2.08 | 0.050 |

Each solution then was adjusted to a pH of 8.2 by the addition of 40% aqueous sodium hydroxide. In Samples 2–4, inclusive, crystals of sodium insulin immediately began to form. Crystals did not form in Sample 1, however, even after stirring for 3 hours.

Sample 1 was titrated with 0.1M aqueous ethylenediaminetetraacetic adic (as the tetrasodium salt); at an EDTA concentration of about 0.006M, crystallization of sodium insulin began. Each Sample was stirred overnight. The crystals of sodium insulin then were collected by centrifugation, washed once with acetone, twice wht absolute alcohol, and once with ether. After drying in vacuo, the yields of sodium insulin were as follows:

| Sample | Yield of Sodium Insulin | | |
|---|---|---|---|
| | Grams | % | U/mg |
| 1 | 1.705 | 85.2 | 25.6 |
| 2 | 1.842 | 92.1 | 25.0 |
| 3 | 1.929 | 96.4 | 23.5 |
| 4 | 1.971 | 98.5 | 23.5 |

The potency of the sodium insulin (and all insulins obtained in subsequent examples) was determined by immunological assay according to the method of G. W. Probst, et al., *J. Pharm. Sci.*, 55, 1408 (1966). Note that the routine standard deviation is ± 15–25% with this method.

EXAMPLE 2

Two g. of purified sodium insulin (from beef pancreas) having a potency of 27.0 U/mg and containing minor amounts of less acidic protein impurities was dissolved in 400 ml of 0.5 N acetic acid. To the resulting solution were added about 20 ml of absolute alcohol and 0.4 ml of a 20% zinc chloride solution, the latter corresponding to 40 mg zinc chloride per gram of insulin. The pH of the solution then was adjusted to 5.95 by adding 20% ammonium hydroxide and the solution was chilled at about 5° for about 72 hours. The zinc insulin crystals which had formed were harvested by centrifugation, washed once with distilled water, and dissolved in 50 ml of acid-phenol water prepared as described in Example 1. The solution was diluted to 100 ml with acid-phenol water. To the resulting solution were added 2.0 g. of sodium chloride (giving a solution 0.34 molar in sodium chloride) and 0.208 g. of EDTA (as the tetrasodium salt, giving a solution 0.005 molar in EDTA). The solution then was adjusted to pH 8.2 with 40% aqueous sodium hydroxide. Crystals of sodium insulin began to form. Crystallization was allowed to continue overnight at ambient temperature. The crystals of sodium insulin were isolated by centrifugation and washed and dried as described in Example 1. The yield of sodium insulin was 1.864 g., corresponding to a 93.2% yield. Potency of the sodium insulin was 27.0 U/mg.

Samples of the sodium insulin starting material and the final sodium insulin of Example 2 were analyzed by polyacrylamide disc-gel electrophoresis, following the procedure employed by R. L. Jackson, et al., *Diabetes*, 21, 235 (1972).

Figure 2:
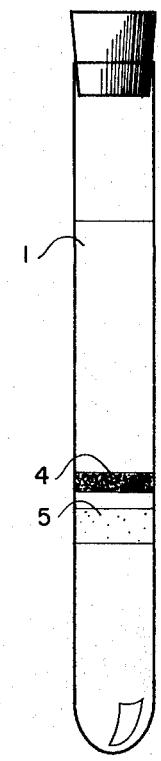

FIG. 1 is a representation of the electrophoretic analysis of the sodium insulin starting material and FIG. 2 is a representation of the electrophoretic analysis of the final sodium insulin. In these Figures, 1 is the polyacrylamide gel, 2 and 3 are non-insulin proteins, and 4 and 5 are insulin and insulin-like proteins.

EXAMPLE 3

The procedure of Example 2 was repeated, except that the starting material was sodium insulin isolated from pork pancreas, having a potency of 25.0 U/mg. The final yield of sodium insulin was 1.862 g., corresponding to a 93.1% yield' potency of the product was 28.9 U/mg.

Figure 3:
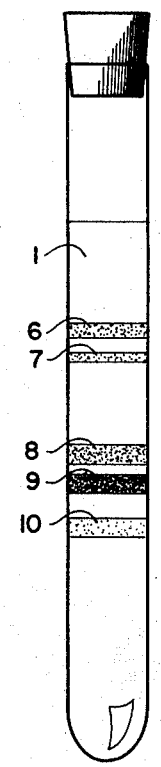
Figure 4:

The starting material (FIG. 3) and final product (FIG. 4) of Example 3 were analyzed by polyacrylamide disc-gel electrophoresis as described for Example 2. In these figures, 1 is the polyacrylamide gel, 6, 7, and 8 are non-insulin proteins, and 9 and 10 are insulin or insulin-like proteins.

From FIGS. 1–4, inclusive, it is clear that the process of the present invention removes non-insulin proteins. Furthermore, this dramatic improvement in the purity of the final alkali metal or ammonium insulin is not apparent from potency and other data alone.

EXAMPLE 4

Six g. of zinc insulin crystals (70% from beef pancreas, 30% from pork pancreas) were dissolved in 300 ml of acid-phenol water prepared as described in Example 1. To a 100-ml aliquot of this solution was added 2.5 g. (0.033 mole) of potassium chloride. The pH of the slightly hazy solution was adjusted to 8.2 by adding 3.5 ml of 10% aqueous potassium hydroxide. To the resulting turbid solution was added 0.3 g. (0.001 mole) of ethylenediaminetetraacetic acid. The pH of the solution then was readjusted with 10% potassium hydroxide until stabilized at 8.2. The solution was stirred for 48 hours at ambient temperature (about 25°); crystallization commenced during the first 12 hours. The resulting potassium insulin was collected by centrifugation, washed twice with absolute alcohol and then once with ether, and dried in vacuo. The yield of potassium insulin was 1.736 g. (86.8%); potency was 24.9 U/mg, potassium content was 1.48%, and moisture content was 10.1%.

EXAMPLE 5

To a 100-ml aliquot of the zinc insulin solution prepared in Example 4 was added 1.4 g. (0.033 mole) of lithium chloride. The solution was adjusted to pH 8.2 by adding 6.2 ml of 1 N lithium hydroxide. The turbid solution was treated with ethylenediaminetetraacetic acid and the pH stabilized at 8.2 with 1 N lithium hydroxide, following the procedure of Example 4. The crystallization procedure of Example 4 also was followed, with similar results. The resulting lithium insulin was collected as described in Example 4, giving 1.234 g. (61.6%), having a potency of 27.8 U/mg, a lithium content of 2.37%, and a moisture content of 3.6%.

EXAMPLE 6

The procedure of Example 5 was repeated, except that the lithium chloride was replaced with 1.8 g. of ammonium chloride and the lithium hydroxide was replaced with 60 ml of 1 N ammonium hydroxide. After adding the ehtylenediaminetetraacetic acid and adjusting the pH with 1 N ammonium hydroxide, no crystallization had occurred after 24 hours. An additional 1.8 g. of ammonium chloride was added. Crystallization occurred after stirring for an additional 24 hours. The resulting ammonium insulin was isolated as described in Example 4, giving 1.018 g. (50.9%), having a potency of 27.6 U/mg, and a moisture content of 7.3%; the insulin gave a sulfated ash of 0.08%.

What is claimed is:

1. A process for preparing an alkali metal or ammonium insulin, which comprises the steps of:
    A. preparing an alkaline aqueous solution of a divalent metal insulin, a divalent metal ion chelating agent, and alkali metal or ammonium ions, wherein the concentration of divalent metal insulin is in the range of from about 10 to about 1,000 U/mg, the divalent metal is selected from the group consisting of manganese, iron, cobalt, nickel, copper, zinc, and cadmium, the concentration of alkali metal or ammonium ions is in the range of from about 0.2 to about 1.0 M, the pH of the solution is in the range of from about 7.6 to about 8.6, the concentration of chelating agent is in the range of from about 0.0002 to about 0.05 M, the molar ratio of chelating agent to divalent metal in the divalent metal insulin is at least about 3:1, and the chelating agent has the general formula,

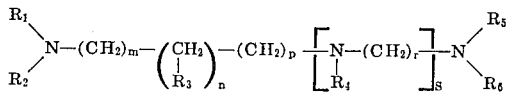

wherein $R_1$ and $R_5$ are monovalent organic radicals independently selected from the group consisting of carboxymethyl, carboxyethyl, $C_1$–$C_6$ alkyl, and $C_1$–$C_6$ hydroxyalkyl; $R_2$ and $R_6$ are monovalent organic radicals independently selected from the group consisting of carboxymethyl and carboxyethyl; $R_3$ is a monovalent radical selected from the group consisting of hydrogen, hydroxy, and $C_1$–$C_6$ alkyl; $R_4$ is a monovalent radical selected from the group consisting of hydrogen, carboxymethyl, and carboxyethyl; $m$ is an integer from 1 to 6, inclusive; $n$ is an integer which is either 0 or 1; $p$ is an integer which is either 0 or 1; $r$ is an integer from 2 to 6, inclusive; and $s$ is an integer from 0 to 2, inclusive; and
    B. crystallizing the alkali metal or ammonium insulin.

2. The process of claim 1, wherein the divalent metal is zinc.

3. The process of claim 1, wherein the alkali metal or ammonium insulin is an alkali metal insulin.

4. The process of claim 3, wherein the alkali metal insulin is sodium insulin.

5. The process of claim 1, wherein the chelating agent is ethylenediamine-N-N,N',N'-tetraacetic acid or an alkali metal or ammonium salt thereof.

6. The process of claim 1, wherein the alkaline aqueous solution of divalent metal insulin contains a preservative at a concentration of from 0 to about 0.4%, weight per volume.

7. The process of claim 6, wherein the preservative is phenol.

8. The process of claim 7, wherein the concentration of phenol is about 0.2%.

* * * * *

UNITED STATES PATENT AND TRADEMARK OFFICE
CERTIFICATE OF CORRECTION

PATENT NO. : 3,856,771
DATED : December 24, 1974
INVENTOR(S) : Richard L. Jackson It is certified that error appears in the above-identified patent and that said Letters Patent are hereby corrected as shown below:

Column 2, line 58, "-teraacetic" should read -- -tetraacetic --.

Column 3, line 63, "crtical" should be deleted.

Column 4, line 31, "of" should read -- or --.

Column 4, line 35, "henerated" should read -- generated --.

Column 4, line 37, "herinbefore" should read -- hereinbefore --

Column 5, line 61, "adic" should read -- acid --.

Column 5, line 66, "wht" should read -- with --.

Column 8, line 7, "1,000 U/mg," should read -- 1,000 U/ml, --.

Column 8, the structural formula between lines 20 and 24 should read as follows:

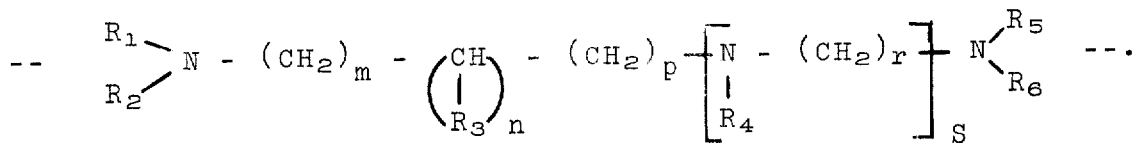

Signed and Sealed this

Fifteenth Day of March 1977

[SEAL]

Attest:

RUTH C. MASON
Attesting Officer

C. MARSHALL DANN
Commissioner of Patents and Trademarks